United States Patent
Mack et al.

(10) Patent No.: US 10,941,046 B2
(45) Date of Patent: Mar. 9, 2021

(54) PROCESS FOR SILICA REMOVAL FROM SODIUM BICARBONATE PRODUCTION WASTEWATER

(71) Applicants: Veolia Water Solutions & Technologies Support, Saint-Maurice (FR); Bernard Roy Mack, Natick, MA (US); Kashi Banerjee, Moon Township, PA (US)

(72) Inventors: Bernard Roy Mack, Natick, MA (US); Kashi Banerjee, Moon Township, PA (US)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 86 days.

(21) Appl. No.: 16/333,255

(22) PCT Filed: Sep. 13, 2017

(86) PCT No.: PCT/US2017/051255
§ 371 (c)(1),
(2) Date: Mar. 14, 2019

(87) PCT Pub. No.: WO2018/063797
PCT Pub. Date: Apr. 5, 2018

(65) Prior Publication Data
US 2019/0241439 A1      Aug. 8, 2019

Related U.S. Application Data

(60) Provisional application No. 62/402,247, filed on Sep. 30, 2016.

(51) Int. Cl.
*C01D 7/00* (2006.01)
*C01D 7/10* (2006.01)
(Continued)

(52) U.S. Cl.
CPC ............... *C01D 7/10* (2013.01); *C01D 7/24* (2013.01); *C01F 7/02* (2013.01); *B01D 9/0059* (2013.01);
(Continued)

(58) Field of Classification Search
CPC .... C01D 7/10; C01D 7/24; C01D 7/26; C01F 7/02; B01D 71/02
See application file for complete search history.

(56) References Cited

U.S. PATENT DOCUMENTS

| 3,870,780 | A | 3/1975 | Guptill | |
| 8,865,095 | B2* | 10/2014 | Walravens | ............... C22B 26/10 |
| | | | | 423/189 |
| 9,051,627 | B2* | 6/2015 | Walravens | ............... C22B 26/10 |

FOREIGN PATENT DOCUMENTS

DE       102012003487 B3      6/2013

* cited by examiner

*Primary Examiner* — Steven J Bos
(74) *Attorney, Agent, or Firm* — Coats & Bennett, PLLC

(57) ABSTRACT

The present invention relates to a process for producing sodium bicarbonate crystals. Sodium carbonate derived from TRONA ore is mixed with a treated mother liquor produced in a downstream process to form a sodium carbonate solution. The sodium carbonate solution is subjected to a crystallization process that produces sodium bicarbonate crystals. The sodium bicarbonate crystals are separated from the sodium carbonate solution to form a mother liquor that includes silica. To remove the silica in the mother liquor, the mother liquor is directed to a reactor where an aluminum salt is mixed with the mother liquor to precipitate hydrous aluminum oxide which adsorbs silica thereon. The hydrous aluminum oxide with adsorbed silica is removed from the mother liquor. This produces the treated mother liquor that is mixed with the sodium carbonate and which forms the sodium carbonate solutions.

11 Claims, 1 Drawing Sheet

(51) Int. Cl.
    *C01F 7/02*    (2006.01)
    *C01D 7/24*    (2006.01)
    *B01D 9/00*    (2006.01)
    *B01D 45/12*    (2006.01)
    *B01D 71/02*    (2006.01)
(52) U.S. Cl.
    CPC .............. *B01D 45/12* (2013.01); *B01D 71/02* (2013.01); *B01D 2251/60* (2013.01); *B01D 2253/104* (2013.01)

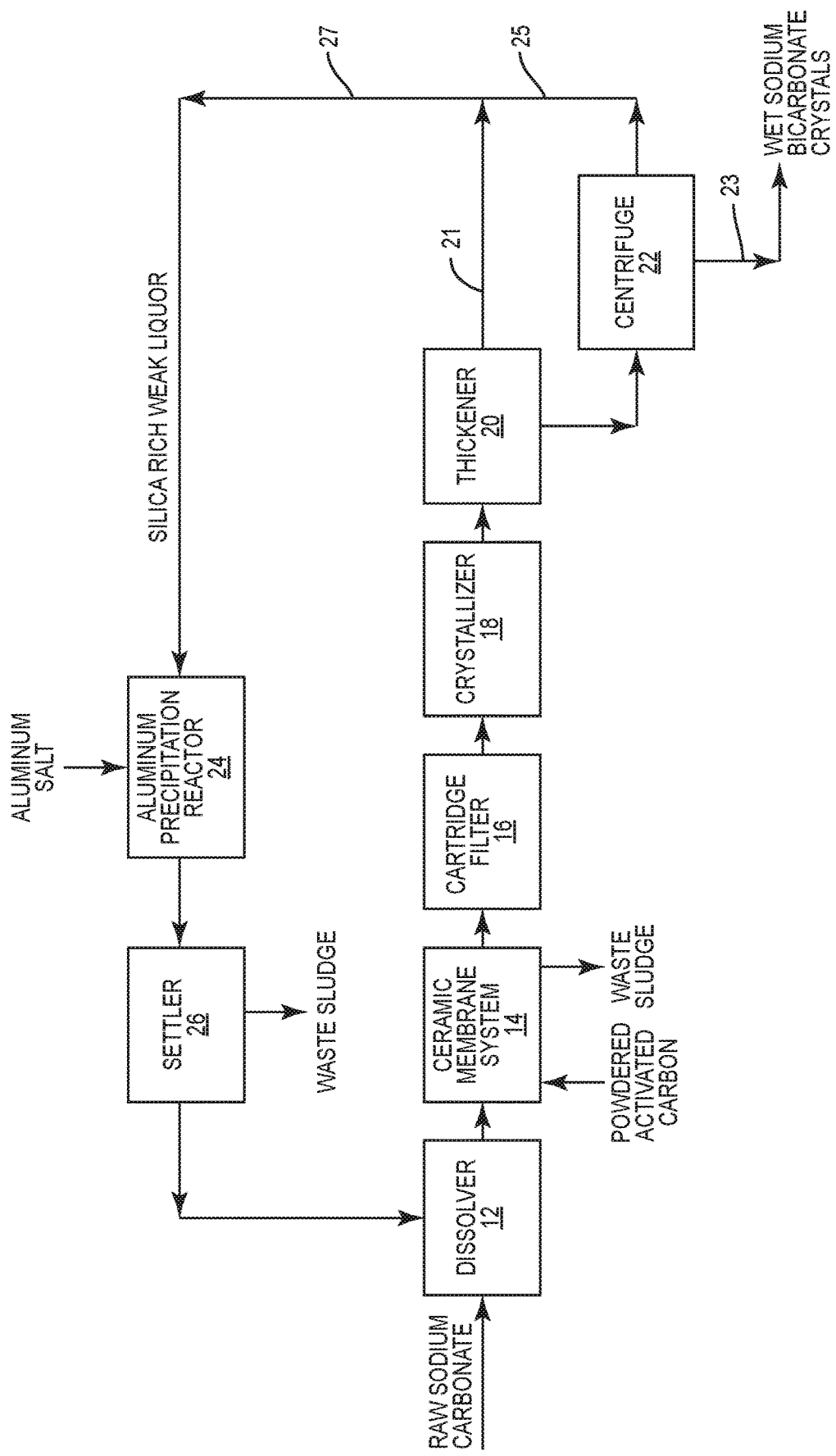

PROCESS FOR SILICA REMOVAL FROM SODIUM BICARBONATE PRODUCTION WASTEWATER

RELATED APPLICATIONS

The present application is a U.S. National Stage Application of PCT Application No. PCT/US2017/051255, with an international filing date of Sep. 13, 2017. Applicant claims priority based on U.S. Patent Application No. 62/402,247 filed Sep. 30, 2016. The subject matter of these applications is incorporated herein in their entirety.

FIELD OF THE INVENTION

The present invention relates to systems and processes for producing sodium bicarbonate crystals.

SUMMARY OF THE INVENTION

The present invention, in one embodiment, relates to a method for producing sodium bicarbonate crystals. Raw sodium carbonate containing silica is subjected to a pre-treatment process. The pre-treatment process produces a sodium carbonate solution that is then subjected to a sodium bicarbonate crystallization process. In the sodium bicarbonate crystallization process, a concentrate is produced and the concentrate includes sodium bicarbonate crystals. The concentrate, along with the sodium bicarbonate crystals, is separated, yielding a mother liquor. The mother liquor is recycled and mixed with the sodium carbonate either during pre-treatment or upstream from pre-treatment. However, before the mother liquor is mixed with the sodium carbonate, silica is removed from the mother liquor. In one embodiment, this is achieved by mixing an aluminum salt with the mother liquor. This precipitates hydrous aluminum oxide. Silica in the mother liquor is adsorbed onto the hydrous aluminum oxide. Hydrous aluminum oxide with adsorbed silica is removed from the mother liquor. Thereafter, the treated mother liquor is appropriately mixed with the sodium carbonate.

In one embodiment, the present invention entails a process for producing sodium bicarbonate crystals. The process entails mixing sodium carbonate containing silica and derived from TRONA ore with a treated mother liquor produced in a downstream process to form a sodium carbonate solution. The sodium carbonate solution is filtered to form or produce a sodium carbonate filtrate. Sodium bicarbonate crystals are formed in the sodium carbonate filtrate. After forming the sodium bicarbonate crystals, the sodium carbonate filtrate having the sodium bicarbonate crystals therein is subjected to a solids-liquid separation process which produces a concentrate that contains the sodium bicarbonate crystals and a mother liquor containing silica. The mother liquor containing silica is directed to a reactor. In the reactor, an aluminum salt is mixed with the mother liquor. This precipitates hydrous aluminum oxide and the silica in the mother liquor is adsorbed onto the hydrous aluminum oxide. The process further includes separating the hydrous aluminum oxide with the adsorbed silica from the mother liquor. This forms the treated mother liquor. It is the treated mother liquor that is mixed with the sodium carbonate to form the sodium carbonate solution.

Other objects and advantages of the present invention will become apparent and obvious from a study of the following description and the accompanying drawings which are merely illustrative of such invention.

BRIEF DESCRIPTION OF THE DRAWINGS

FIG. 1 is a schematic illustration of the process of the present invention for producing sodium bicarbonate crystals.

DESCRIPTION OF THE INVENTION

The present invention relates to a process for producing sodium bicarbonate crystals from raw sodium carbonate. One exemplary process is illustrated in FIG. 1.

The process begins with a source of sodium carbonate, sometimes referred to as soda ash. In this exemplary embodiment, the sodium carbonate is derived from TRONA ore. TRONA ore is a naturally occurring mineral that is chemically known as sodium sesquicarbonate ($Na_2CO_3 \cdot NaHCO_3 \cdot 2H_2O$). The sodium carbonate derived from TRONA ore can be pre-treated in a number of ways, depending on the condition of the sodium carbonate and/or the application. Typically the TRONA ore is refined into a slurry of sodium sesquicarbonate, which is an intermediate sodium carbonate product that typically contains both sodium carbonate and sodium bicarbonate. Thus, in this example, the raw sodium carbonate, referred to in FIG. 1, is sodium sesquicarbonate which will be referred to herein as raw sodium carbonate.

With particular reference to FIG. 1, the raw sodium carbonate is directed to a dissolver 12. In the dissolver 12, the raw sodium carbonate is mixed with an effluent from a side stream settler 26. As will be discussed subsequently herein, the effluent from the settler 26 is a treated mother liquor that is produced in a downstream process. In any event, the mixing of the effluent from the settler 26 with the raw sodium carbonate produces a sodium carbonate solution. In certain applications, it may be appropriate to utilize a feedwater in addition to the effluent from the settler 26. That is, in some cases it may be appropriate to mix the raw sodium carbonate in the dissolver with both the treated mother liquor from settler 26, as well as another feedwater. In any event, in one embodiment, the sodium carbonate is dissolved at a temperature of approximately 95° C. and this results in a solution close to saturation of 30% sodium carbonate by wt. In order to achieve the 95° C. operating temperature in the dissolver 12, the mother liquor can be appropriately heated before being mixed with the raw sodium carbonate in the dissolver 12.

The sodium carbonate solution produced by the dissolver 12 is, in one embodiment, subjected to one or more filtration processes. Various filtration processes can be employed. In the embodiment illustrated in FIG. 1, the sodium carbonate solution is subjected to a membrane separation process. This will effectively remove suspended solids from the sodium carbonate solution. In one example, the membrane separation unit may comprise a ceramic membrane system 14, such as illustrated in FIG. 1. The membrane separation unit or the ceramic membrane system 14 produces a filtrate or permeate, as well as a reject, which in the case of FIG. 1 is referred to as waste sludge.

In some cases, additional filtration may be desirable. In the FIG. 1 embodiment, the filtrate from the ceramic membrane system 14 is directed to a cartridge filter 16 where the filtrate is further filtered to remove fine suspended solids. The filtrate or effluent from the cartridge filter 16 is still referred to as a sodium carbonate solution.

The sodium carbonate solution is then subjected to a process where at least portions of the sodium carbonate are converted to sodium bicarbonate crystals. This occurs in what is referred to in FIG. 1 as a crystallizer 18. Crystallizer 18 functions to produce the sodium bicarbonate crystals. In one embodiment, the crystallizer 18 comprises a carbonating tower. Here, the saturated sodium carbonate solution moves downwardly through the carbonation tower. As the sodium carbonate solution moves downwardly through the tower, the solution cools and reacts with carbon dioxide that is injected into the tower. This forms sodium bicarbonate crystals in the solution. In particular, the carbon dioxide is provided at ambient temperature or lower such that the sodium carbonate reacts with the carbon dioxide and water to form the sodium bicarbonate crystals and at the same time the temperature is reduced to approximately 70° C. Since sodium bicarbonate has a solubility much less than sodium carbonate (15% by wt. at 70° C.), crystals of sodium bicarbonate are formed.

Downstream of the crystallizer 18, the effluent from the carbonating process is subjected to one or more clarification or filtering processes where the sodium bicarbonate crystals are removed from the solution. Various clarification or filtration processes can be used. In the end, a concentrate is produced and the concentrate includes the sodium bicarbonate crystals. Also, such a clarification or filtration process produces a mother liquor. Since the raw sodium carbonate includes silica, it follows that the mother liquor will also include silica.

In the embodiment illustrated in FIG. 1, the effluent from the crystallizer 18 (or the effluent from the carbonating tower) is directed to a thickener 20. The thickener 20 produces a concentrate that includes the sodium bicarbonate crystals and the concentrate is directed to a centrifuge 22. In addition to the thickener 20 producing the concentrate, the thickener 20 also produces a mother liquor that is directed into line 21. Centrifuge 22 separates the wet sodium bicarbonate crystals from the concentrate. The wet sodium bicarbonate crystals are discharged via line 23 and subsequently dried. Centrifuge 22 discharges the concentrate, after the sodium bicarbonate crystals have been separated, and directs the concentrate from the centrifuge via line 25. As seen in FIG. 1, the mother liquor in line 21 is mixed with the concentrate in line 25. The combined liquid is directed into line 27 and the liquid therein is still referred to as a mother liquor or a silica-rich weak liquor. The mother liquor in line 27 is directed into a reactor 24 that is referred to as an aluminum precipitation reactor.

As FIG. 1 illustrates, the mother liquor in line 27 is eventually recycled to the dissolver 12 where it is used to saturate the raw sodium carbonate before the sodium bicarbonate crystals are produced. In order to protect the sodium bicarbonate product from unwanted precipitation of silica and to protect downstream equipment from fouling, it is desirable to remove the silica from the mother liquor in line 27 prior to the mother liquor being introduced into the mainstream. The process for removing silica from the mother liquor begins with reactor 24. An aluminum salt, such as sodium aluminate, polyaluminum chloride, or aluminum chlorohydrate, is mixed with the mother liquor in reactor 24. The silica removal action can be performed in a high speed mixed reactor, such as a reactor that is manufactured and sold by Veolia Water and referred to as a TURBOMIX™ reactor. In the alternative, a continuous flow stirred reactor can also be employed for mixing the aluminum salt with the mother liquor in reactor 24. In one embodiment, it is preferable to maintain the pH in the reactor 24 at approximately 7.5 to approximately 9.0.

Under this process condition, hydrous aluminum oxide will be precipitated [equation 1] which has coagulating and adsorptive properties.

$$Al^{3+} + 3OH^- = Al(OH)_3 \quad (1)$$

Depending on the desired percent removal of silica, the mass ratio of aluminum to silica is in the range between 1:1 and 4:1. The precipitated hydrous aluminum oxide solids can be separated from the mother liquor in a Veolia Water proprietary high rate settling device (ACTIFLO™ or MULTIFLO™), conventional clarifier including a lamella separator, or in any filtration device.

After the mother liquor 27 has been mixed with the aluminum salt in the reactor 24, the mother liquor, along with the hydrous aluminum oxide having the adsorbed silica thereon, is pumped to a settler 26. This essentially entails a clarification step where the precipitated hydrous aluminum oxide, along with the adsorbed silica, are allowed to settle in the settler 26 and are separated from the mother liquor. The resulting mother liquor is directed from the settler 26 to the dissolver 12 where it is mixed with the raw sodium carbonate. The effluent or mother liquor from settler 26 is referred to herein as treated mother liquor. The term "treated mother liquor" means a mother liquor that at one point contains silica and which has been treated with an aluminum salt to precipitate hydrous aluminum oxide with adsorbed silica thereon and where hydrous aluminum oxide and adsorbed silica has been removed. As indicated in FIG. 1, the excess aluminum can be removed by adsorption onto powdered activated carbon used to remove organic compounds in the ceramic membrane unit along with the other insoluble impurities in the soda ash. As indicated in FIG. 1, the powdered activated carbon can be added at the inlet of the ceramic membrane system 14 or at a point between the dissolver 12 and the ceramic membrane system.

There are many advantages to the process described above and shown in FIG. 1. The hydrous aluminum oxide has a high adsorption capacity for silica and hence provides an efficient process for removing silica from the mother liquor. Further, the hydrous aluminum oxide functions as a coagulant which promotes efficient settling in the settler 26. In addition, the process for treating the mother liquor does not require a two-stage pH adjustment. One reaction tank for precipitating silica is sufficient. Aluminum salts are highly soluble in water. The dissolution rate of aluminum ions in water is very fast. Consequently, hydrous aluminum oxide precipitation kinetics is relatively fast. Further in the process, no additional heating energy is required to increase the temperature of the water. Aluminum salts, compared to other chemicals such as magnesium chloride or magnesium sulfate, are less expensive. Finally, hydrous aluminum oxide precipitates at neutral pH conditions. Consequently, little or no pH adjustment is required for silica removal reaction.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A process for producing sodium bicarbonate crystals from sodium carbonate containing silica, the process comprising:

mixing a treated mother liquor with the sodium carbonate containing silica to form a sodium carbonate solution;
crystallizing the sodium carbonate solution to form sodium bicarbonate crystals;
clarifying the sodium carbonate solution to produce a concentrate having the sodium bicarbonate crystals and a mother liquor containing silica;
directing the mother liquor containing silica to a reactor;
mixing an aluminum salt with the mother liquor containing silica;
precipitating hydrous aluminum oxide in the mother liquor containing silica;
adsorbing silica onto the hydrous aluminum oxide in the mother liquor containing silica; and
separating the hydrous aluminum oxide having the adsorbed silica from the mother liquor containing silica to form the treated mother liquor that is mixed with the sodium carbonate to form the sodium carbonate solution.

2. The process of claim 1 further including filtering the sodium carbonate solution before crystallizing the sodium carbonate solution to form the sodium bicarbonate crystals.

3. The process of claim 1, including prior to forming the sodium bicarbonate crystals, filtering the sodium carbonate solution in a membrane separation unit which produces a filtrate and a reject stream.

4. The process of claim 1 wherein, prior to forming the sodium bicarbonate crystals, directing the sodium carbonate solution through a ceramic membrane and removing suspended solids from the sodium carbonate solution and wherein the ceramic membrane produces a permeate and a reject.

5. The process of claim 1 including directing the sodium carbonate to a dissolver and directing the treated mother liquor to the dissolver and mixing the treated mother liquor with the sodium carbonate in the dissolver to dissolve the sodium carbonate so as to form the sodium carbonate solution.

6. The process of claim 1 further including directing the concentrate having the sodium bicarbonate crystals to a centrifuge and separating the sodium bicarbonate crystals from the concentrate and thereafter mixing the concentrate with the mother liquor containing silica.

7. A process for producing sodium bicarbonate crystals, comprising:
mixing sodium carbonate containing silica and derived from trona ore with a treated mother liquor to form a sodium carbonate solution;
after mixing the sodium carbonate with the treated mother liquor, filtering the sodium carbonate solution to produce a sodium carbonate filtrate;
forming sodium bicarbonate crystals in the sodium carbonate filtrate;
after forming the sodium bicarbonate crystals in the sodium carbonate filtrate, subjecting the sodium carbonate filtrate having the sodium bicarbonate crystals therein to a solids-liquid separation process and producing a concentrate containing the sodium bicarbonate crystals and a mother liquor containing silica;
directing the mother liquor containing silica to a reactor;
mixing an aluminum salt with the mother liquor containing silica;
precipitating hydrous aluminum oxide in the mother liquor containing silica;
adsorbing silica onto the hydrous aluminum oxide in the mother liquor containing silica; and
separating the hydrous aluminum oxide with the adsorbed silica thereon from the mother liquor containing silica to form the treated mother liquor that is mixed with the sodium carbonate to form the sodium carbonate solution.

8. The method of claim 7 including directing the concentrate having the sodium bicarbonate crystals therein to a centrifuge and separating the sodium bicarbonate crystals from the concentrate and thereafter mixing the concentrate with the mother liquor containing silica prior to the mother liquor containing silica being treated to remove the silica.

9. The method of claim 7 wherein filtering the sodium carbonate solution comprises directing the sodium bicarbonate solution through a ceramic membrane to produce the sodium carbonate filtrate.

10. The method of claim 9 wherein the sodium carbonate filtrate produced by the ceramic membrane is further filtered by a cartridge filter.

11. A process for producing sodium bicarbonate crystals from sodium carbonate containing silica, the process comprising:
mixing a treated mother liquor with the sodium carbonate which is derived from trona ore to form a sodium carbonate solution;
crystallizing the sodium carbonate solution to form sodium bicarbonate crystals;
clarifying the sodium carbonate solution to produce a concentrate having the sodium bicarbonate crystals and a mother liquor containing silica;
directing the mother liquor containing silica to a reactor;
removing silica from the mother liquor containing silica by mixing an aluminum salt with the mother liquor containing silica and precipitating hydrous aluminum oxide and adsorbing silica onto the hydrous aluminum oxide;
separating the hydrous aluminum oxide having the adsorbed silica from the mother liquor containing silica to form the treated mother liquor that is mixed with the sodium carbonate to form the sodium carbonate solution; and
after mixing the treated mother liquor with the sodium carbonate and before crystallizing the sodium carbonate solution to form sodium bicarbonate crystals, removing aluminum from the sodium carbonate solution by mixing powdered activated carbon with the sodium carbonate solution.

* * * * *